Feb. 6, 1962 HANS-JOACHIM KLEINSCHMIDT 3,020,036
RUBBER SPRING
Filed July 2, 1959 3 Sheets-Sheet 3

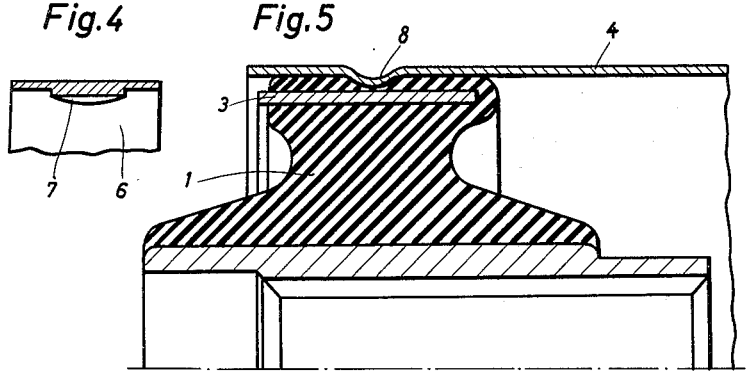
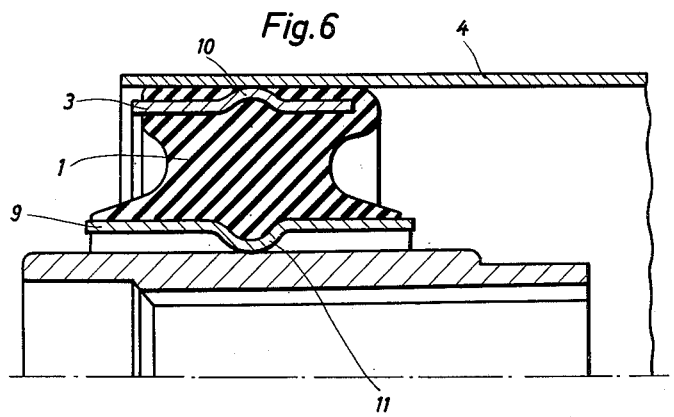
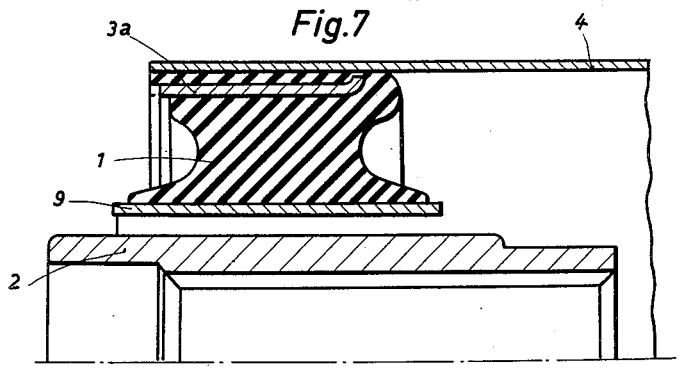

United States Patent Office 3,020,036
Patented Feb. 6, 1962

3,020,036
RUBBER SPRING
Hans-Joachim Kleinschmidt, Essen, Germany, assignor to Gelenkwellenbau G.m.b.H., Essen, Germany
Filed July 2, 1959, Ser. No. 824,648
11 Claims. (Cl. 267—1)

The present invention relates to a rubber spring which is installed in a tube or the like, and mounted between the inner wall of such tube and the outer wall of a bushing or a shaft. Such rubber springs are employed for instance in connection with drive shafts of motor vehicles, for the drive of winches, and the like, to provide resilient support and, principally, to act as a torsion member.

With heretofore known arrangements of the type involved, rubber springs are vulcanized to an inner or outer metal ring or the like. In this way, the forces enter through the inner metal ring from which they are conveyed to the rubber and are further passed on resiliently to the outer metal ring. This ring which is press-fitted to other shaft elements, for instance follower members, tubes, or the like, conveys the forces thereto. In this connection it is necessary that the outer ring surface has a fine finish, for instance is ground, and that the respective shaft elements, such as said follower member or tube, have their surface likewise precision finished in order to obtain the necessary press fit between the respective structural elements. Thus, a rubber spring system of the above mentioned type comprises a number of elements and is too expensive in view of the required precision.

Also rubber springs are known which are installed in a tube and are arranged intermediate the inner wall of the tube and a shaft, while the rubber spring is subdivided into a plurality of individual layers. The connection between the rubber spring and the shaft on one hand and the tube on the other hand is effected by longitudinal shafts or grooves.

According to another rubber spring system based on the same principle, the connection of the rubber spring with the shaft is effected by a key and groove. However, the provision of additional recesses or cut-outs, such as grooves in one element and corresponding keys in the other element, increase the production costs of such spring systems and also frequently weaken the elements to be interconnected.

It is, therefore, an object of the present invention to provide a rubber spring system which will overcome the above mentioned drawbacks.

It is another object of this invention to provide a rubber spring system with a simple and economic rubber spring.

It is also an object of this invention to provide a method for employing a rubber spring according to the present invention.

These and other objects and advantages of the invention will appear more clearly from the following specification in connection with the accompanying drawings, in which:

FIGS. 1 to 3 and 5 to 7 are longitudinal sections through various embodiments of a rubber spring system according to the invention.

FIGURE 4 is a sectional view showing a clamping band for holding a spring compressed during installation thereof in a support.

General arrangement

The rubber spring according to the invention is characterized primarily in that a one or multi part ring of metal or the like is near the periphery of the spring vulcanized thereto in such a way that the radial distance of the ring from the inner periphery amounts to a multiple of the distance of said ring from the outer periphery. The metal ring vulcanized to the rubber spring so to speak divides the rubber spring into a larger elastic inner portion and a considerably smaller outer portion intended for connection of the spring to the respective element. Due to the oversize of the rubber spring, the smaller rubber spring portion, will, after installation of the spring in a tube or follower element, produce an extremely high compression in the rubber. In these circumstances it is not necessary to machine the inner surface of the tube for receiving the spring.

Accordingly, the method of employing the rubber spring according to the invention consists in compressing the spring portion between the outer circumference thereof and said spring and then installing the spring in the tube.

According to an embodiment of the invention which has proved highly successful in practice, a smooth metal ring may be employed but, if desired, also an edge of the metal ring may be bent off toward the outside at that side thereof where the pressing operation starts. In this way, the rubber edge will obtain an additional support for the pressing operation. In view of the high friction between rubber and metal, a proper power transmission will be assured.

In order further to improve the connection between the rubber spring and the outer tube, said tube may be provided with bores or the like for receiving rubber portions of the rubber spring. During the installation of the spring in the tube, these bores are advantageous covered from the outside. If desired, also the outer tube may be provided with one or more bead-like protrusions for entering the adjacent rubber layer so that also in this way the rubber tension and connection will be increased.

If desired, near the inner circumference of the rubber spring, a one or multi part ring may be vulcanized to the spring. The outer and the inner ring vulcanized to the spring may be provided with protrusions or beads directed to the outer surface of the rubber spring in order to increase the clamping effect. When divided inner and/or outer rings are employed, the axial edges of the ring segments may be bent off and the said bent off portions will then rest against the inner surface of the outer or inner tube after the spring has been installed.

Structural arrangement

Figure 1:
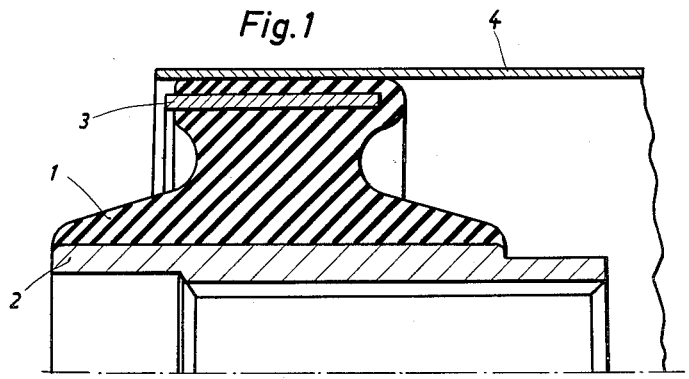

Referring now to the drawings in detail and FIG. 1 thereof in particular, the spring system of FIG. 1 comprises a rubber spring 1 which may be designed in customary manner and which is vulcanized to a bushing 2. Near the outer circumference of this spring there is provided a metal ring 3 which is vulcanized to the adjacent rubber spring portions in such a way that the said metal ring 3 divides the spring into a larger inner portion and a considerably smaller outer portion. The spring is produced with oversize and is then compressed and pressed into the outer tube 4. Instead of a tube, also a follower bell or any other structural element required may be provided. In this connection it is not necessary that the inner surface of the tube be machined. Sandblasting will suffice for ring 3, and the said ring 3 may be cut off from tubular stock.

Figure 2:
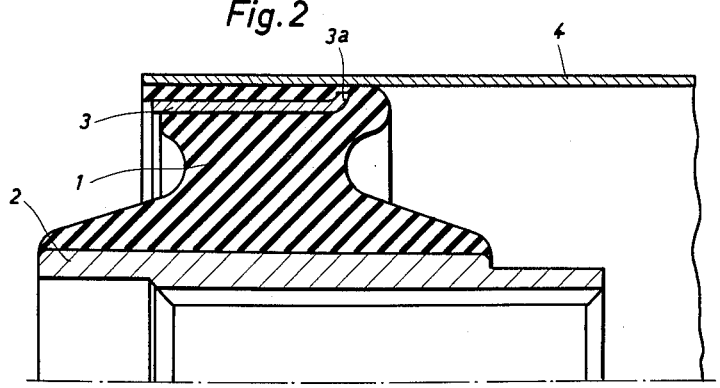

According to the arrangement of FIG. 2, a metal ring 3 is vulcanized to the rubber spring 1, one end portion of said metal ring 3 being flared outwardly as indicated by the reference numeral 3a. This flare serves additionally to support the rubber edge when the rubber spring is pressed into tube 4.

Figure 3:
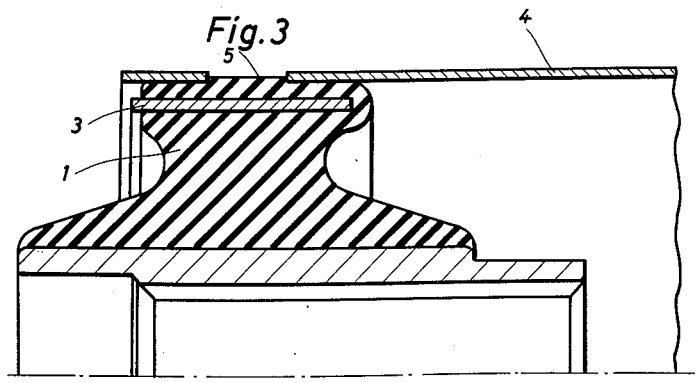

According to FIG. 3, the outer tube 4 is provided with a number of bores 5 which prior to the installation of the rubber spring 1 are closed by means of a tension band 6 and by means of eyes 7 (FIG. 4) or closure elements corresponding to the size of said bores. The rubber spring is pressed into the tube whereupon the auxiliary means for the installation are removed. The strongly pre-loaded rubber of the rubber spring will then press to a certain extent into the bores 5 thereby additionally anchoring the rubber spring to the tube 4. The bores 5 may be arranged so as to be located in one plane or they may be offset with regard to each other. Instead of bores, naturally also slots or other easily produced cut-outs may be employed.

According to the embodiment of FIG. 5, tube 4 will after installation of the rubber spring be provided with a bead 8 which is pressed into the rubber of the spring to increase the compression thereof. Instead of a bead also a plurality of beads may be arranged one adjacent each other or series of beads may be provided.

According to the arrangement of FIG. 6, the rubber spring in addition to being provided with an outer ring 3 also comprises an inner ring 9. The two rings 3 and 9 may be provided with beads 10 and 11 directed toward the inner and outer peripheral portions, respectively, of the spring. When rubber springs are involved for high speed drives, a slight grinding of the crests of said beads 10 and 11 may be effected in order to allow a precise centering.

Figure 8:
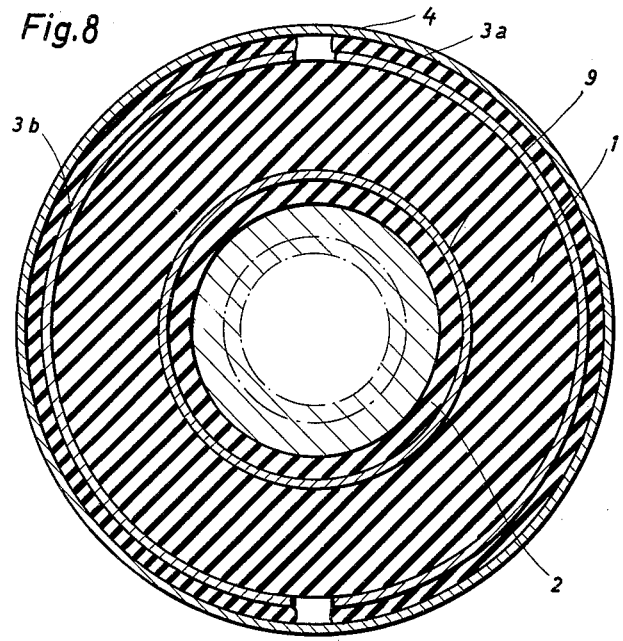
FIG. 8 illustrates a cross section through the rubber spring of FIG. 7.

With regard to the rubber spring shown in longitudinal section in FIG. 7 and in cross section in FIG. 8, the outer ring vulcanized to the adjacent rubber material consists of two portions 3a and 3b, whereas the inner ring 9 consists of a single piece. Of course, if so desired, also the inner ring may be composed of a plurality of parts. Furthermore, the outer ring, instead of being composed of two parts, may also consist of more than two parts.

Figure 9A:
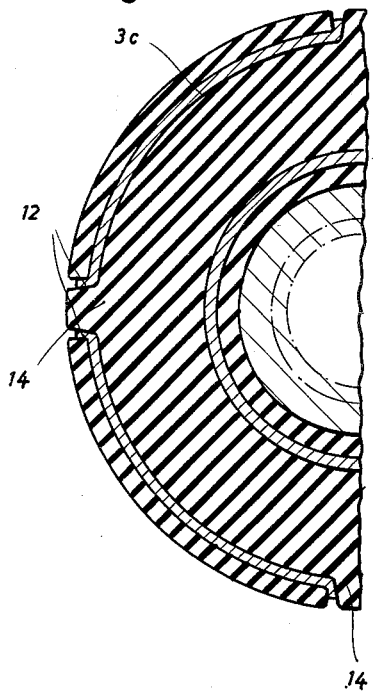
FIGS. 9a and 9b illustrate in cross section a further modified rubber spring according to the invention prior to its installation and after its installation respectively.
Figure 9B:
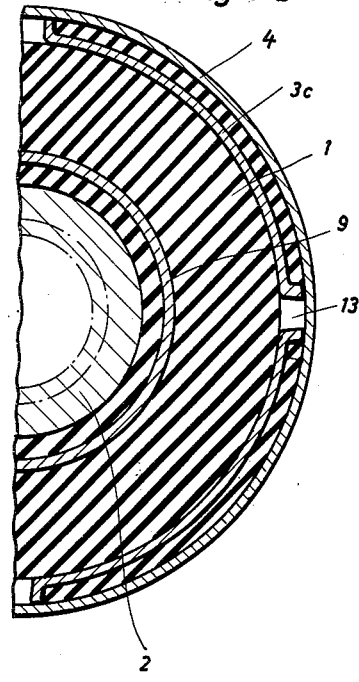

Referring now to FIG. 9a illustrating a further modification of the rubber spring according to the present invention, the rubber spring shown therein is in its expanded condition, i.e. before its installation in a tube. According to FIG. 9a the outer ring is composed of four sections 3c (two sections only being shown in FIG. 9a which represents half of the spring). The axial edges of said ring segments 3c may be provided with bent out portions 12. FIG. 9b shows half of a spring similar to that of FIG. 9a in installed condition, i.e. in compressed condition. It will be evident from FIG. 9b that the bent off portions 12 may be so designed that they will rest against the inner surface of the outer tube 4. The inner ring 9 is shown to consist of two portions. Between the bent out portions of two ring segments, gaps 13 may be left as shown in FIG. 9b. However, if desired, these gaps may be filled in by a rubber portion 14 as shown in FIG. 9a.

As will be evident from the above, the spring system according to the present invention is considerably simpler and more economical than heretofore known spring systems of the general type involved. With applicant's arrangement not only is it not necessary to machine the outer ring and the corresponding counter members, such as tubes etc., but also, since no machining is required, the respective elements can be made lighter than was heretofore possible, which fact is of particular importance in connection with the motor vehicle industry. The arrangement according to the invention is particularly vibration absorbent inasmuch as due to the ring vulcanized into the rubber spring, the latter has been divided into two elements of considerably different compression.

It is, of course, to be understood that the present invention is, by no means, limited to the particular constructions shown in the drawings but also comprises any modifications within the scope of the appended claims.

What I claim is:

1. In a spring arrangement: an outer member of tubular shape provided with passages therethrough, an inner member having a substantially cylindrical outer surface, an annular rubber spring body interposed in compressed condition between said outer member and said inner member, said annular rubber spring body having peripheral portions thereof extending into said passages, and a metallic ring inserted into said rubber spring body and vulcanized thereto, the radial distance of said metallic ring in said rubber spring body from said inner member being a multiple of the distance between said outer member and said metallic ring, said body being a solid uninterrupted mass of rubber between said ring and said inner member, and the rubber between said ring and said outer member being in a state of compression greatly exceeding the compression of the rubber inside the ring.

2. In a spring arrangement: an outer member of tubular shape, an inner member having a substantially cylindrical outer surface and spaced in radial direction from said outer member, an annular rubber spring body interposed in compressed condition between said outer member and said inner member, and a metallic ring inserted into said rubber spring body and vulcanized thereto, the radial distance of said metallic ring in said rubber spring body from said inner member being a multiple of the distance between said outer member and said metallic ring, said outer member being provided with bead means extending inwardly into said annular rubber body, said body being a solid uninterrupted mass of rubber between said ring and said inner member, and the rubber between said ring and said outer member being in a state of compression greatly exceeding the compression of the rubber inside the ring.

3. As an article of manufacture: a tubular rubber spring body having an annular multi-part metallic insert vulcanized thereto, said annular metallic insert being composed of a plurality of segmental sections spaced from each other in circular direction with the ends of each segment bent off outwardly, said annular metallic insert being spaced from the inner periphery of said spring body a distance amounting to a multiple of the distance between the outer periphery of said spring body and said annular metallic insert, said spring body being solid rubber inside the insert for a radial distance which is a multiple of the spacing of the insert from the outer periphery of the spring body.

4. An article according to claim 3, in which said spring body has portions extending into the space between the ends of said segmental sections.

5. As an article of manufacture: an outer substantially tubular member, an inner member also substantially tubular, a tubular rubber spring body having an annular insert vulcanized thereto and interposed in compressed condition between said members and vulcanized to at least the inner member, said annular insert being considerably closer to the said outer member than to the said inner member, there being an uninterrupted mass of rubber inside said insert of greater radial extent than the rubber on the outside of said insert, the rubber of the spring body between the insert and the said outer member being in a state of high compression.

6. An article of manufacture according to claim 5, in which the radial distance of said metallic insert from the said inner member is a multiple of the radial distance between the said outer member and said annular metallic insert.

7. An article of manufacture according to claim 6, in which one end of said annular metallic insert flares outwardly toward the said outer member.

8. As an article of manufacture: a tubular rubber spring body having a first annular metallic insert vulcanized therein and having a second annular metallic insert vulcanized thereto on the inside surface thereof in radially spaced relationship inwardly from said first annular metallic insert, the radial distance from the outer periphery of the spring body to the first annular metallic insert being considerably less than the radial distance between said two annular metallic inserts, said spring being a solid uninterrupted mass of rubber between said inserts, and an outer tubular member surrounding said spring body smaller in diameter than the normal outside diameter of said spring body whereby the rubber of the spring body radially outwardly of said first annular insert is in a high state of compression.

9. An article of manufacture according to claim 8, in which said first annular metallic insert is composed of a plurality of sections.

10. An article of manufacture according to claim 8, in which at least said first annular metallic insert has bead means formed therein bulging out toward the outer periphery of said rubber spring body.

11. A tubular rubber spring according to claim 10, in which the crest of said bead means is ground smooth and flush with the inside of said outer tubular member.

References Cited in the file of this patent

UNITED STATES PATENTS

| | | |
|---|---|---|
| 2,049,024 | Robertson | July 28, 1936 |
| 2,069,270 | Piron | Feb. 2, 1937 |
| 2,216,455 | Piron | Oct. 1, 1940 |

FOREIGN PATENTS

| | | |
|---|---|---|
| 489,318 | France | Sept. 13, 1918 |
| 522,718 | Italy | Apr. 12, 1955 |